(12) United States Patent  
Holmes

(10) Patent No.: US 9,599,245 B2  
(45) Date of Patent: Mar. 21, 2017

(54) TWO-STAGE VARIABLE FORCE SOLENOID

(75) Inventor: Garrett R. Holmes, Ortonville, MI (US)

(73) Assignee: BORGWARNER INC., Auburn Hills, MI (US)

(*) Notice: Subject to any disclaimer, the term of this patent is extended or adjusted under 35 U.S.C. 154(b) by 505 days.

(21) Appl. No.: 13/984,909

(22) PCT Filed: Feb. 24, 2012

(86) PCT No.: PCT/US2012/026445  
§ 371 (c)(1),  
(2), (4) Date: Aug. 12, 2013

(87) PCT Pub. No.: WO2012/118698  
PCT Pub. Date: Sep. 7, 2012

(65) Prior Publication Data  
US 2013/0333773 A1    Dec. 19, 2013

Related U.S. Application Data

(60) Provisional application No. 61/447,414, filed on Feb. 28, 2011.

(51) Int. Cl.  
*F15B 13/043* (2006.01)  
*F16K 31/02* (2006.01)  
(Continued)

(52) U.S. Cl.  
CPC .......... *F16K 31/02* (2013.01); *F15B 13/0402* (2013.01); *F15B 13/0435* (2013.01);  
(Continued)

(58) Field of Classification Search  
CPC ....... Y10T 137/86614; Y10T 137/8659; Y10T 137/86582; Y10T 137/7761;  
(Continued)

(56) References Cited

U.S. PATENT DOCUMENTS 2,087,387 A * 7/1937 Price et al. ................ 251/30.01  
4,014,509 A 3/1977 Yoshino et al.  
(Continued)

FOREIGN PATENT DOCUMENTS

DE        29 32 810 A1    2/1981  
JP     2009287613 A  * 12/2009  
WO   WO 2010/117477 A2  10/2010

OTHER PUBLICATIONS

English language abstract and machine-assisted English translation for DE 29 32 810 extracted from espacenet.com database on Jan. 25, 2017, 11 pages.

*Primary Examiner* — Craig J Price  
(74) *Attorney, Agent, or Firm* — Howard & Howard Attorneys PLLC

(57) ABSTRACT

A two-stage, variable force, solenoid control valve for regulating fluid pressure can include a valve body having a pilot fluid passage, including a metering land, in fluid communication with a flow amplifying fluid passage through a valve control port formed in the valve body. A solenoid operated pilot valve member, disposed in the pilot fluid passage can have a metering orifice operable in combination with the metering land for selectively connecting the valve control port with a pressurized fluid supply port and a return exhaust port in response to activation of a solenoid. A flow amplifying spool valve member, in fluid communication with the valve control port of the pilot valve member at one end, can selectively connect a load control port with the pressurized fluid supply port and the return exhaust port in response to pilot valve member operation.

17 Claims, 2 Drawing Sheets

(51) Int. Cl.
*F16K 31/06* (2006.01)
*F15B 13/04* (2006.01)

(52) U.S. Cl.
CPC ...... *F16K 31/0613* (2013.01); *F16K 31/0686* (2013.01); *Y10T 137/7761* (2015.04)

(58) Field of Classification Search
CPC .. F16K 31/0613; F16K 31/0686; F16K 31/02; F15B 13/0402; F15B 13/0435
USPC ................. 137/625.61, 625.64; 251/30.01
See application file for complete search history.

(56) References Cited

U.S. PATENT DOCUMENTS

| | | | |
|---|---|---|---|
| 4,485,846 A * | 12/1984 | Neff | 137/625.64 |
| 4,576,200 A * | 3/1986 | Janecke | G05D 16/2093 137/624.13 |
| 4,605,197 A | 8/1986 | Casey et al. | |
| 4,741,364 A * | 5/1988 | Stoss et al. | 137/625.64 |
| 4,966,195 A | 10/1990 | McCabe | |
| 5,051,631 A | 9/1991 | Anderson | |
| 5,546,847 A * | 8/1996 | Rector et al. | 137/625.64 |
| 5,611,370 A | 3/1997 | Majmolhoda | |
| 5,709,368 A * | 1/1998 | Hajek, Jr. | 251/30.02 |
| 5,921,526 A | 7/1999 | Najmolhoda | |
| 5,984,259 A | 11/1999 | Najmolhoda et al. | |
| 5,996,628 A | 12/1999 | Najmolhoda et al. | |
| 6,109,300 A | 8/2000 | Najmolhoda | |
| 6,223,761 B1 | 5/2001 | Najmolhoda et al. | |
| 6,405,746 B2 | 6/2002 | Harms et al. | |
| 6,408,883 B2 * | 6/2002 | Motoki et al. | 137/625.64 |
| 6,435,472 B1 | 8/2002 | Najmolhoda et al. | |
| 6,571,828 B2 | 6/2003 | Harms et al. | |
| 6,814,103 B2 * | 11/2004 | Neuhaus | G05D 16/2013 137/625.61 |
| 6,926,033 B2 | 8/2005 | Harms et al. | |
| 7,458,561 B2 | 12/2008 | Oishi | |
| 2001/0009164 A1 * | 7/2001 | Motoki et al. | 137/625.65 |
| 2001/0025662 A1 * | 10/2001 | Kawamura et al. | 137/625.65 |
| 2002/0104572 A1 * | 8/2002 | Sen | 137/625.65 |
| 2003/0106419 A1 * | 6/2003 | Yoshino | 91/418 |
| 2003/0188788 A1 | 10/2003 | Harms et al. | |
| 2005/0173008 A1 | 8/2005 | Harms et al. | |
| 2006/0021663 A1 | 2/2006 | Grancher | |
| 2007/0163662 A1 | 7/2007 | Reilly et al. | |
| 2008/0017261 A1 | 1/2008 | Harms et al. | |
| 2008/0023661 A1 * | 1/2008 | Gu et al. | 251/30.01 |
| 2010/0139795 B1 | 6/2010 | Holmes et al. | |
| 2010/0313980 A1 * | 12/2010 | Shimizu et al. | 137/625.64 |
| 2013/0255809 A1 * | 10/2013 | Bruck et al. | 137/625.6 |

\* cited by examiner

TWO-STAGE VARIABLE FORCE SOLENOID

FIELD OF THE INVENTION

The invention relates to valves and valve actuation for regulating fluid pressure in a passage, either by closing the passage or restricting it by a definite predetermined motion of the closing-element with means in the form of a valve actuator which uses electrical energy to change the position of a movable element, i.e. a valve, to regulate or control the flow of a fluent material through a passage or opening and means for moving the valve with a force which is in proportion to the magnitude of the electrical energy supplied, or to regulate pressure in proportion to the magnitude of the electrical energy supplied, and to fluid handling systems for controlling fluid pressure using a single valve with actuating means, wherein the single valve controls communication with three or more pressure lines and has an actuator arranged to determine the relative pressure in a load control line, and the single valve is actuated by a fluid pressure motive means controlled by a pilot valve in which the pilot valve is operated by electric motive means.

BACKGROUND

Solenoid operated valves can be used in automobiles to control numerous devices, such as clutch mechanisms or other transmission components, or virtually any other hydraulically actuated vehicle system. Direct-acting solenoid operated valves can be used to control the pilot pressure of a valve which opposes the control pressure. These pilot valves can often incorporate the use of a spool or pin valve member that moves within a valve body portion of the device. The spool or pin valve member can have a hollow bore with a passage for providing fluid connection between the supply port, control port, and exhaust port of the valve member with respect to a hollow portion of the pin valve member. The spool or pin valve member can have an edge that can block entry of fluid from a port in one direction and can slightly open to allow fluid to flow between an edge of the valve member and another port. Thus, metering of fluid flow through the valve member can be done at the edge of the pin valve member and the supply port. Normally the controlled output pilot pressure from the direct-acting, solenoid operated, pressure control pilot valve is connected by suitable piping or conduits to the second-stage valve to be controlled. This type of configuration requires additional vehicle space to be allocated to the system; adds additional material weight to the vehicle; incorporates a greater number of parts to be manufactured, transported, stored, and assembled; and increases the assembly time and effort required to build and/or service the vehicle. In addition, the variable piping length between the pilot valve and the second-stage valve can adversely affect the performance of the system by introducing time delays in pressure arrival to the load device related to the length of piping between pilot valve and second-stage valve. Furthermore, system performance can also be adversely affected by increasing the possibility of leakage along the length of the piping between the pilot valve and the second-stage valve. Any air pockets in the piping length can adversely affect the performance of the system by introducing pressure transients and ineffective pressure delivery due to the compressibility of the air pocket.

SUMMARY

It would be desirable to provide a two-stage, variable force, solenoid control valve for regulating pressure to alleviate the problems associated with current assemblies noted above. The two-stage, variable force, solenoid control valve can include a valve body having a pilot fluid passage including a metering land. The pilot fluid passage can be in fluid communication with a flow amplifying fluid passage through a flow amplifying valve control port formed in the valve body. The valve body can include a pressurized fluid supply port operably connected to the pilot fluid passage and to the flow amplifying fluid passage. A load control port can operably connect to the flow amplifying fluid passage, and a return exhaust port can operably connect to the flow amplifying fluid passage and to the pilot fluid passage. A solenoid can operably connect to the valve body adjacent the pilot fluid passage. A pilot valve member can be disposed in the pilot fluid passage of the valve body, and can operably connect to the solenoid. The pilot valve member can have a metering orifice operable in combination with the metering land of the valve body for selectively connecting the flow amplifying valve control port in fluid communication between the pressurized fluid supply port and the return exhaust port in response to activation of the solenoid. A flow amplifying valve member can be operably disposed in the flow amplifying fluid passage of the valve body, and can be in fluid communication with the flow amplifying valve control port of the pilot valve member at one end for selectively connecting the load control port in fluid communication between the supply port and the exhaust port.

The concept is an improvement of existing solenoid technology to improve control system performance and reduce control system cost. This design combines the attributes of a direct-acting type proportional control solenoid and a pilot type, two-stage proportional solenoid into one single solenoid operated valve package. Combining the two attributes provides an improvement by using a single orifice pilot regulator to control a flow amplifying valve. This combination minimizes leakage, reduces pilot channel length, and minimizes trapped air in the pilot circuit. The resultant combination improves dynamic hydraulic response, improves controllability of down stream load, regulation valve, clutch, etc., and potentially eliminates other control valves that are needed in existing control systems. The combination allows precise dimensional control and predictable behavior for the flow amplifying valve control passage and associated expandable chamber defined between the valve control port and the flow amplifying valve member in response to operation of the pilot valve by eliminating the variable size, length, restrictions, and volume associated with the prior piping connections between the pilot valve and the second-stage valve. This combination can also eliminate any time delays, leakage, pressure transients, and ineffective pressure delivery associated with the prior piping connections between the pilot valve and the second-stage valve. The design also permits the inclusion of pressure gain in the second-stage valve, if desired.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
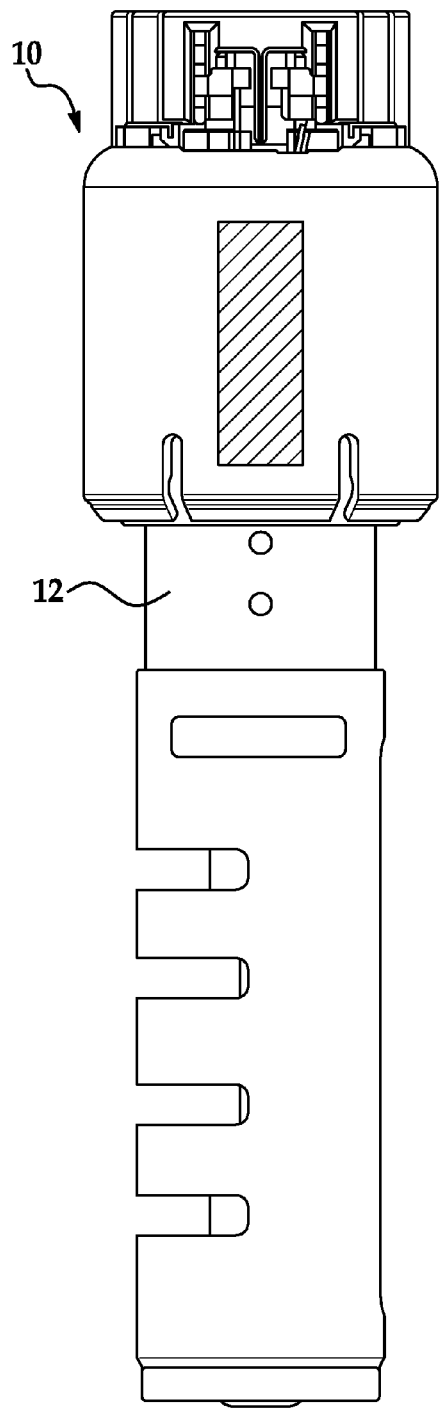
FIG. 1 is a side view of a normally high type, two-stage, variable force, solenoid control valve according to the present invention, whose output pressure is high at the time of non-energization and is decreased in accordance with an increase in applied current.
Figure 2:
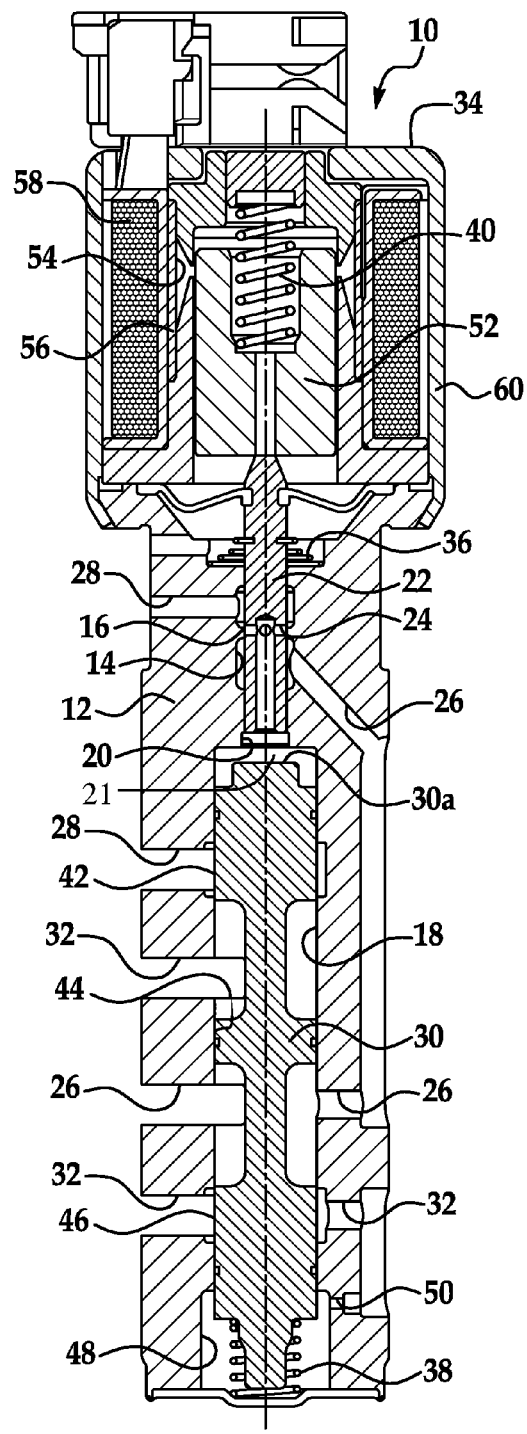
FIG. 2 is a cross sectional view of the normally high type, two-stage, variable force, solenoid control valve of FIG. 1.

Referring now to FIGS. 1-2, a normally high type, two-stage, variable force, solenoid control valve 10 for regulating fluid pressure can include a valve body 12 having a pilot fluid passage 14, including a metering land 16, in fluid communication with a flow amplifying fluid passage 18 through a valve control port 20 formed in the valve body 12. A solenoid operated pilot valve member 22, disposed in the pilot fluid passage 14, can include a metering orifice 24 operable in cooperation with the metering land 16 for selectively connecting the valve control port 20 with a pressurized fluid supply port 26 and a return exhaust port 28 in response to solenoid operated activation of the pilot valve member 22. A flow amplifying spool valve member 30 can be disposed in the flow amplifying fluid passage 18, in fluid communication with the valve control port 20 at one end 30a for selectively connecting a load control port 32 with the pressurized fluid supply port 26 and the return exhaust port 28 in response to pressurized fluid flow through the pilot valve member 22. The pilot valve member 22 controls fluid pressure within an expandable chamber 21 defined between the valve control port 20 and one end 30a of the flow amplifying spool valve member 30. Control of pressure to expand and retract the associated expandable chamber 21 adjacent end 30a of the flow amplifying spool valve member 30 by pilot valve member 22 exerts control over fluid pressure output from the flow amplifying fluid passage 18 in response to reciprocal movement of the flow amplifying spool valve member 30 within the flow amplifying fluid passage 18.

The valve body 12 can be defined by a single elongate valve body 12 housing the pilot valve member 22 and the flow amplifying spool valve member 30 for reciprocal movement therein. The pilot valve member 22 and the flow amplifying spool valve member 30 can be moveable long a common axis of the single elongate valve body 12. A solenoid actuator 34 can be operably connected to the pilot valve member 22 adjacent the pilot fluid passage 14. The solenoid actuator 34 can be operable to move the pilot valve member 22 in proportion to a magnitude of electrical energy supplied. A pilot valve biasing member 36 can urge the pilot valve member 22 toward a predetermined pilot valve position. By way of example and not limitation as illustrated in FIG. 2, the pilot valve member 22 is urged into contact with the solenoid actuator 34. A spool valve biasing member 38 can urge the flow amplifying spool valve member 30 toward a predetermined spool valve position. By way of example and not limitation as illustrated in FIG. 2, the spool valve member 30 is urged toward the valve control port 20 to close fluid communication between the load control port 32, the pressurized fluid supply port 26, and the return exhaust port 28. A solenoid biasing member 40 can urge the solenoid armature 52 toward a predetermined solenoid position of the armature 52. By way of example and not limitation as illustrated in FIG. 2, the solenoid armature 52 is urged into contact with the pilot valve member 22. The normally high type control valve 10 maintains high fluid pressure to load control port 20 when solenoid 34 is de-energized.

The flow amplifying spool valve member 30 can include a first land 42 operable in cooperation with movement relative to the valve body 12 in response to fluid pressure acting through the valve control port 20 to open and close fluid communication between the load control port 32 and the return exhaust port 28. The first land 42 can isolate the valve control port 20 from the return exhaust port 28. A second land 44 of the spool valve member 30 can be operable in cooperation with the valve body 12 to isolate the pressurized fluid supply port 26 from the return exhaust port 28 through an entire range of movement of the spool valve member 30. A third land 46 of the spool valve member 30 can be operable in cooperation with movement relative to the valve body 12 in response to fluid pressure acting through the valve control port 20 to open and close fluid communication between the load control port 32 and the pressurized fluid supply port 26. The third land 46 can also isolate the load control port 32 from a feedback pressure chamber 48 in fluid communication with the load control port 32 through a feedback pressure orifice 50.

The two-stage, variable force, solenoid control valve can be incorporated into a fluid handling system including a pressurized fluid supply line, a return exhaust line, and a load control line for regulating pressure. The fluid handling system can be a clutch mechanism, or other transmission components, or virtually any other hydraulically actuated vehicle system. As previously described in greater detail above, the valve body 12 can have a pilot fluid passage 14, including a metering land 16, in fluid communication with a flow amplifying fluid passage 18 through a valve control port 20 formed in the valve body 12. A solenoid operated pilot valve member 22, disposed in the pilot fluid passage 14, can have a metering orifice 24 operable in combination with the metering land 16 for selectively connecting the valve control port 20 with a pressurized fluid supply line through a pressurized fluid supply port 26 and a return exhaust line through a return exhaust port 28 in response to solenoid operated activation of the pilot valve member 22. A flow amplifying spool valve member 30 can be disposed in the flow amplifying fluid passage 18, in fluid communication with the valve control port 20 at one end 30a for selectively connecting a load control line through a load control port 32 with the pressurized fluid supply port 26 and the return exhaust port 28 in response to pressurized fluid flow through the pilot valve member 22.

The single elongate valve body 12 can enclose the pilot valve member 22 and the flow amplifying spool valve member 30 for reciprocal movement therein. The pilot valve member 22 and the flow amplifying spool valve member 30 can be moveable long a common axis of the single elongate valve body 12. The solenoid actuator 34 can be operably connected to the pilot valve member 22 adjacent the pilot fluid passage 14. The solenoid actuator 34 can be biased by a spring member 40 toward the pilot valve member 22 and can be operable to move the pilot valve member 22 in proportion to a magnitude of electrical energy supplied. The spring member 36 can bias the pilot valve member 22 in a direction away from the flow amplifying spool valve member 30 to provide zero pilot pressure and maintain contact with armature 52. While the spring member 38 can bias the flow amplifying spool valve member 30 toward the valve control port 20 to provide a second stage control pressure offset less than a pilot stage pressure to improve output gain linearity and reduce system fluid contamination sensitivity.

The two-stage, variable force, solenoid control valve 10 can include a ferromagnetic, rod-like, solid, cylindrical shaped armature 52 suspended by low spring rate springs 36, 40 at opposite ends of the armature 52 within an aperture or bore 54 of a hollow cylindrical shaped bobbin 56 for reciprocal movement between positions corresponding to a closed valve position and fully open valve position in response to applied electrical current to an electromagnetic coil 58. The position of the armature 52 is controlled by balancing the variable force of an electromagnetic field of an electromagnetic coil 58 against the force of a compression coil spring 40 which biases the armature 52 and engaged pilot valve member 22 toward the closed position of the pilot valve member 22. The electromagnetic coil 58, bobbin 56 and armature 52 reside in the solenoid housing 60 in a manner such that the housing 60 provides a concentration of flux of the electromagnetic field at the armature 52. A fluid control pilot valve member 22 engages one end of the armature 52 in response to urging of a compression coil spring 36 and moves relative to a valve seat or metering land 16 disposed in the valve body 12 to selectively communicate a pressurized fluid supply port 26 and a return exhaust port 28 with respect to a valve control port 20 so as to regulate fluid pressure at the valve control port 20 in a manner proportional to the magnitude of applied electrical current.

The flow amplifying spool valve member 30 can be disposed in the valve body 12 for providing a two-stage capability. One stage of operation involves controlling the fluid pressure output through the load control port 32 by moving the spool valve member 30 between minimum and maximum pressure output spool positions in a manner proportional to the magnitude of electrical current supplied to the coil 58 controlling movement of the pilot valve member 22 and corresponding fluid pressure delivered to the valve control port 20. The third land 46 of the spool valve member 30 isolates the load control port 32 from a feedback pressure chamber 48. The feedback pressure chamber 48 is in fluid communication with the load control port 32 through a feedback pressure orifice 50. Another stage of operation involves the fluid pressure output through the return exhaust port 28 by moving the spool valve member 30 between minimum and maximum pressure spool positions in a manner proportional to the magnitude of electrical current supplied to the coil 58 controlling movement of the pilot valve member 22 and corresponding fluid pressure delivered to the valve control port 20. The direction of armature 52 movement in response to coil 58 being energized and the corresponding valve function is dependent on whether the valve is configured as a normally high type (as illustrated in FIG. 2) or a normally low type (as illustrated in FIG. 3).

Figure 3:
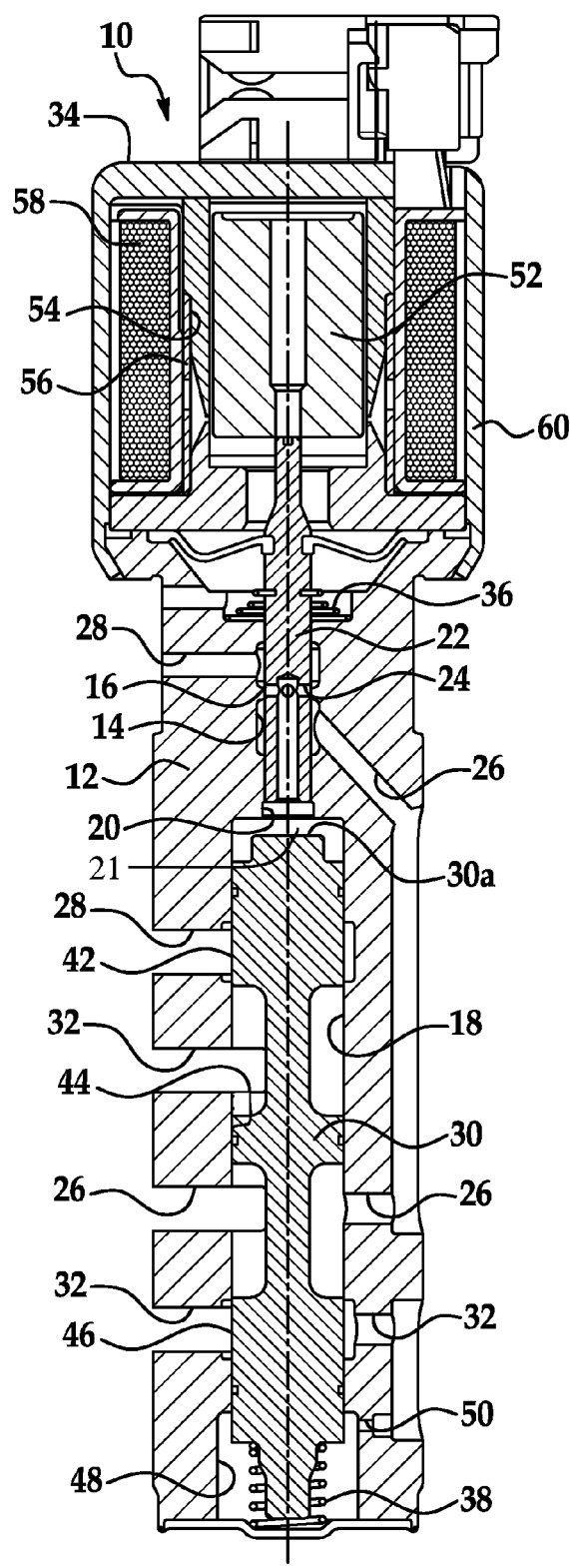
FIG. 3 is a cross sectional view of a normally low type, two-stage, variable force, solenoid control valve, whose output pressure is low at the time of non-energization and is increased in accordance with an increase in applied current.

Referring now to FIG. 3, it should be recognized that a normally low type, two-stage, variable force, solenoid control valve 10 can also be provided according to the invention for regulating fluid pressure. The normally low type, two stage, variable force, solenoid control valve 10 is identical in construction to the normally high type control valve 10 described above, except for the elimination of the biasing spring 40, the elongation of pilot valve member 22, and the direction of operation of the armature 52 when coil 58 is energized. The description set forth above can be referenced for a detailed explanation of the various enumerated common components between the normally high type and normally low type control valves 10. In operation, the normally low type control valve 10 maintains a low fluid pressure in the valve control port 20 when the solenoid 34 is de-energized, which corresponds to low fluid pressure being maintained in the load control port 32.

The normally low and the normally high control pressures refer to a de-energized state of a solenoid. The force generated in a solenoid is limited in magnitude creating a functional relationship between an opening point for a normally low control pressure valve or a closing point for a normally high control pressure valve. Solenoid mechanisms include two different configurations for the magnetic package, while the armature motions are in opposite directions dependent on whether the linear solenoid is a part of a normally high or a normally low type valve assembly package. When the forces are balanced (i.e. when net spring force from springs plus pressure force from inlets equals magnetic force) the armature will be in equilibrium and a desired flow will be established through the valve seat. A desired control pressure is achieved having a low leak behavior such that the flow rate is largest at some point between energized and de-energized states. The resulting flow versus current curve resembles a bell curve, such that normally high and normally low valve assemblies provide substantially proportional linear curves. By using two springs, a net preload can be defined to lower the opening point current needed to open a normally closed valve or to close a normally open valve. By way of example and not limitation, the flow amplifying valve member 30 is illustrated with a load control port 32 pressure output gain ratio of 1:1. However, it should be recognized that with an appropriately sized, stepped, flow amplifying valve member 30, a pressure gain ratio of other than 1:1 can be incorporated into the assembly to provide the desired load control port 32 pressure output.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A two-stage, variable force, solenoid control valve (10) for regulating fluid pressure comprising:
    a single unitary valve body (12) having a pilot fluid passage (14) and a flow amplifying fluid passage (18), the pilot fluid passage (14) including a metering land (16) and in fluid communication with the flow amplifying fluid passage (18) through a valve control port (20) formed in the single unitary valve body (12);
    a solenoid operated pilot valve member (22), disposed in the pilot fluid passage (14), having a metering orifice (24) operable in combination with movement relative to the metering land (16) for selectively connecting the valve control port (20) with a pressurized fluid supply port (26) and a return exhaust port (28) in response to solenoid operated activation of the pilot valve member (22); and
    a flow amplifying spool valve member (30) disposed in the flow amplifying fluid passage (18), in fluid communication with the valve control port (20) at one end (30a) for selectively connecting a load control port (32) with the pressurized fluid supply port (26) and the return exhaust port (28) in response to fluid pressure controlled through the pilot valve member (22); and
    a spring member (36) for biasing the pilot valve member (22) in a direction away from the flow amplifying spool valve member (30) to provide zero pilot pressure and maintain contact with an armature (52).

2. The control valve (10) of claim 1, wherein the single unitary valve body (12) further comprises:
the single unitary monolithic elongate valve body (12) housing the pilot valve member (22) and the flow amplifying spool valve member (30) for reciprocal movement.

3. The control valve (10) of claim 2 further comprising:
the pilot valve member (22) and the flow amplifying spool valve member (30) moveable long a common axis of the single unitary monolithic elongate valve body (12).

4. The control valve (10) of claim 1 further comprising:
a solenoid actuator (34) connected to the pilot valve member (22) adjacent the pilot fluid passage (14), the solenoid actuator (34) operable to move the pilot valve member (22) in proportion to a magnitude of electrical energy supplied.

5. The control valve of claim 1 further comprising:
a spool valve biasing member (38) for urging the flow amplifying spool valve member (30) toward a predetermined spool valve position to provide a second stage control pressure offset less than a pilot stage pressure.

6. The control valve of claim 1 further comprising:
the solenoid operated pilot valve member (22) supported by the valve body (12) for reciprocation within the pilot fluid passage (14) of the valve body (12), and the solenoid operated pilot valve member (22) defining an internal fluid passage extending between the metering orifice (24) formed in the solenoid operated pilot valve member (22) and the valve control port (20) formed in the valve body (12) for selectively connecting the valve control port (20) with the pressurized fluid supply port (26) and the return exhaust port (28) in response to solenoid operated activation of the pilot valve member (22).

7. The control valve (10) of claim 1, wherein the flow amplifying spool valve member (30) further comprises:
a land (46) isolating the load control port (32) from a feedback pressure chamber (48) located within the single unitary valve body (12), the feedback pressure chamber (48) in fluid communication with the load control port (32) through a feedback pressure orifice (50).

8. A two-stage, variable force, solenoid control valve (10) for regulating fluid pressure comprising:
a single unitary monolithic elongate valve body (12) having a pilot fluid passage (14) and a flow amplifying fluid passage (18), the pilot fluid passage (14) having a metering land (16) and the flow amplifying fluid passage (18) in fluid communication with the pilot fluid passage (14) through a valve control port (20) formed in the single unitary monolithic elongate valve body (12), the single unitary monolithic elongate valve body (12) including a pressurized fluid supply port (26) connected to the pilot fluid passage (14) and to the flow amplifying fluid passage (18), a load control port (32) connected to the flow amplifying fluid passage (18), and a return exhaust port (28) connected to the flow amplifying fluid passage (18) and to the pilot fluid passage (14);
a solenoid (34) connectible to the single unitary monolithic elongate valve body (12) adjacent the pilot fluid passage (14);
a pilot valve member (22) disposed in the pilot fluid passage (14) of the single unitary monolithic elongate valve body (12) and connected to the solenoid (34), the solenoid (34) operable to move the pilot valve member (22) in proportion to a magnitude of electrical energy supplied, the pilot valve member (22) having a metering orifice (24) operable in combination with movement relative to the metering land (16) of the valve body (12) for selectively connecting the valve control port (20) in fluid communication between the pressurized fluid supply port (26) and the return exhaust port (28) in response to activation of the solenoid (34); and
a flow amplifying spool valve member (30) disposed in the flow amplifying fluid passage (18) of the single unitary monolithic elongate valve body (12) and in fluid communication with the valve control port (20) associated with the metering land (16) of the pilot valve member (22) at one end (30a) to define an expandable chamber (21) located within the single unitary monolithic elongate valve body (12) between the one end (30a) and the valve control port (20), the flow amplifying spool valve member (30) for selectively connecting the load control port (32) in fluid communication between the pressurized fluid supply port (26) and the return exhaust port (28) in response to fluid pressure in the expandable chamber (21) controlled through the pilot valve member (22), wherein the flow amplifying spool valve member (30) includes a first land (42) operable in cooperation with movement relative to the valve body (12) in response to fluid pressure acting through the valve control port (20) to open and close fluid communication between the load control port (32) and the return exhaust port (28), the first land (42) isolating the valve control port (20) from the return exhaust port (28), a second land (44) operable in cooperation with movement relative to the valve body (12) to isolate the pressurized fluid supply port (26) from the return exhaust port (28), and a third land (46) operable in cooperation with movement relative to the valve body (12) in response to fluid pressure acting through the valve control port (20) to open and close fluid communication between the load control port (32) and the pressurized fluid supply port (26), the third land (46) isolating the load control port (32) from a feedback pressure chamber (48) in fluid communication with the load control port (32) through a feedback pressure orifice (50).

9. The control valve (10) of claim 8 further comprising:
a pilot valve biasing member (36) for urging the pilot valve member (22) toward a predetermined pilot valve position to provide zero pilot pressure and maintain contact with solenoid (34);
a spool valve biasing member (38) for urging the flow amplifying spool valve member (30) toward a predetermined spool valve position to provide a second stage control pressure offset less than a pilot stage; and
a solenoid biasing member (40) for urging the solenoid toward a predetermined solenoid position.

10. The control valve of claim 8 further comprising:
the solenoid operated pilot valve member (22) supported by the valve body (12) for reciprocation within the pilot fluid passage (14) of the valve body (12), and the solenoid operated pilot valve member (22) defining an internal fluid passage extending between the metering orifice (24) formed in the solenoid operated pilot valve member (22) and the valve control port (20) formed in the valve body (12) for selectively connecting the valve control port (20) with the pressurized fluid supply port

(26) and the return exhaust port (28) in response to solenoid operated activation of the pilot valve member (22).

11. In a fluid handling system including a pressurized fluid supply line, a return exhaust line, and a load control line, a two-stage, variable force, solenoid control valve (10) for regulating fluid pressure comprising:
a single monolithic elongate valve body (12) having a pilot fluid passage (14) and a flow amplifying fluid passage (18), the pilot fluid passage (14) including a metering land (16), and in fluid communication with the flow amplifying fluid passage (18) through a valve control port (20) formed in the single unitary monolithic elongate valve body (12);
a solenoid operated pilot valve member (22), disposed in the pilot fluid passage (14), having a metering orifice (24) operable in combination with movement relative to the metering land (16) for selectively connecting the valve control port (20) with the pressurized fluid supply line through a pressurized fluid supply port (26) and the return exhaust line through a return exhaust port (28) in response to solenoid operated activation of the pilot valve member (22);
a flow amplifying spool valve member (30) disposed in the flow amplifying fluid passage (18), in fluid communication with the valve control port (20) at one end (30a) defining an expandable chamber (21)) located within the single monolithic elongate valve body (12) between the one end (30a) and the valve control port (20), the flow amplifying spool valve member (30) for selectively connecting the load control line through a load control port (32) with the pressurized fluid supply port (26) and the return exhaust port (28) in response to fluid pressure in the expandable chamber (21) controlled through the pilot valve member (22); and
a spring member (36) for biasing the pilot valve member (22) in a direction away from the flow amplifying spool valve member (30) to provide zero pilot pressure and maintain contact with an armature (52).

12. The two-stage, variable force, solenoid control valve (10) of claim 11, wherein the single unitary monolithic elongate valve body (12) further comprises:
the single unitary monolithic elongate valve body (12) enclosing the pilot valve member (22) and the flow amplifying spool valve member (30) for reciprocal movement.

13. The two-stage, variable force, solenoid control valve (10) of claim 12 further comprising:
the pilot valve member (22) and the flow amplifying spool valve member (30) are moveable along a common axis of the single elongate valve body (12).

14. The two-stage, variable force, solenoid control valve (10) of claim 11 further comprising:
a solenoid actuator (34) connected to the pilot valve member (22) adjacent the pilot fluid passage (14), the solenoid actuator (34) biased by a spring member (40) toward the pilot valve member (22) and operable to move the pilot valve member (22) in proportion to a magnitude of electrical energy supplied.

15. The two-stage, variable force, solenoid control valve (10) of claim 11 further comprising:
a spring member (38) for biasing the flow amplifying spool valve member (30) toward the valve control port (20) to provide a second stage control pressure offset less than a pilot stage pressure to improve output gain linearity and reduce system fluid contamination sensitivity.

16. The two-stage, variable force, solenoid control valve (10) of claim 11 further comprising:
the solenoid operated pilot valve member (22) supported by the valve body (12) for reciprocation within the pilot fluid passage (14) of the valve body (12), and the solenoid operated pilot valve member (22) defining an internal fluid passage extending between the metering orifice (24) formed in the solenoid operated pilot valve member (22) and the valve control port (20) formed in the valve body (12) for selectively connecting the valve control port (20) with the pressurized fluid supply port (26) and the return exhaust port (28) in response to solenoid operated activation of the pilot valve member (22).

17. A two-stage, variable force, solenoid control valve (10) for regulating fluid pressure comprising:
a single elongate valve body (12) having a pilot fluid passage (14) with a metering land (16) and a flow amplifying fluid passage (18) in fluid communication with the pilot fluid passage (14) through a valve control port (20) formed in the valve body (12), the valve body (12) including a pressurized fluid supply port (26) connected to the pilot fluid passage (14) and to the flow amplifying fluid passage (18), a load control port (32) connected to the flow amplifying fluid passage (18), and a return exhaust port (28) connected to the flow amplifying fluid passage (18) and to the pilot fluid passage (14);
a solenoid (34) connectible to the valve body (12) adjacent the pilot fluid passage (14);
a pilot valve member (22) disposed in the pilot fluid passage (14) of the valve body (12) and connected to the solenoid (34), the solenoid (34) operable to move the pilot valve member (22) in proportion to a magnitude of electrical energy supplied, the pilot valve member (22) having a metering orifice (24) operable in combination with movement relative to the metering land (16) of the valve body (12) for selectively connecting the valve control port (20) in fluid communication between the pressurized fluid supply port (26) and the return exhaust port (28) in response to activation of the solenoid (34); and
a flow amplifying spool valve member (30) disposed in the flow amplifying fluid passage (18) of the valve body (12) and in fluid communication with the valve control port (20) associated with the metering land (16) of the pilot valve member (22) at one end (30a) to define an expandable chamber (21) between the one end (30a) and the valve control port (20), the flow amplifying spool valve member (30) for selectively connecting the load control port (32) in fluid communication between the pressurized fluid supply port (26) and the return exhaust port (28) in response to fluid pressure in the expandable chamber (21) controlled through the pilot valve member (22), the flow amplifying spool valve member including a first land (42) operable in cooperation with movement relative to the valve body (12) in response to fluid pressure acting through the valve control port (20) to open and close fluid communication between the load control port (32) and the return exhaust port (28), the first land (42) isolating the valve control port (20) from the return exhaust port (28), a second land (44) operable in cooperation with movement relative to the valve body (12) to isolate the pressurized fluid supply port (26) from the return exhaust port (28), and a third land (46) operable in cooperation with movement relative to the valve body (12) in response to fluid pressure acting through the valve control port (20) to open and close fluid communication between the load control port (32) and the pressurized fluid supply port (26), the third land (46) isolating the load control port (32) from a feedback pressure chamber (48) in fluid communication with the load control port (32) through a feedback pressure orifice (50).

* * * * *